No. 649,663. Patented May 15, 1900.
P. GOLDSMITH.
BICYCLE SUPPORT.
(Application filed June 24, 1899.)
(No Model.) 5 Sheets—Sheet 1.
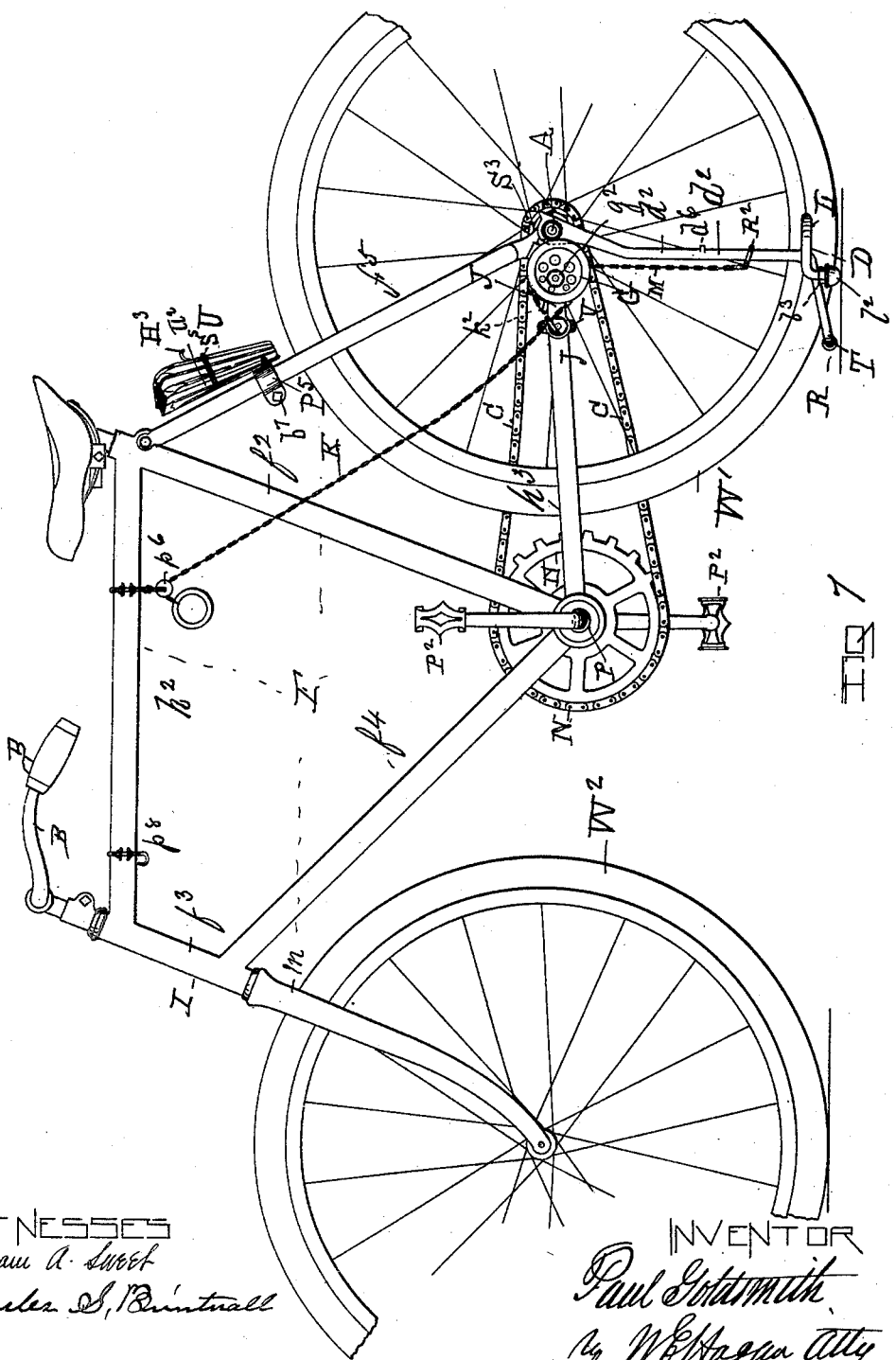
WITNESSES
William A. Sweet
Charles S. Brintnall
INVENTOR
Paul Goldsmith
by W. E. Hagan Atty

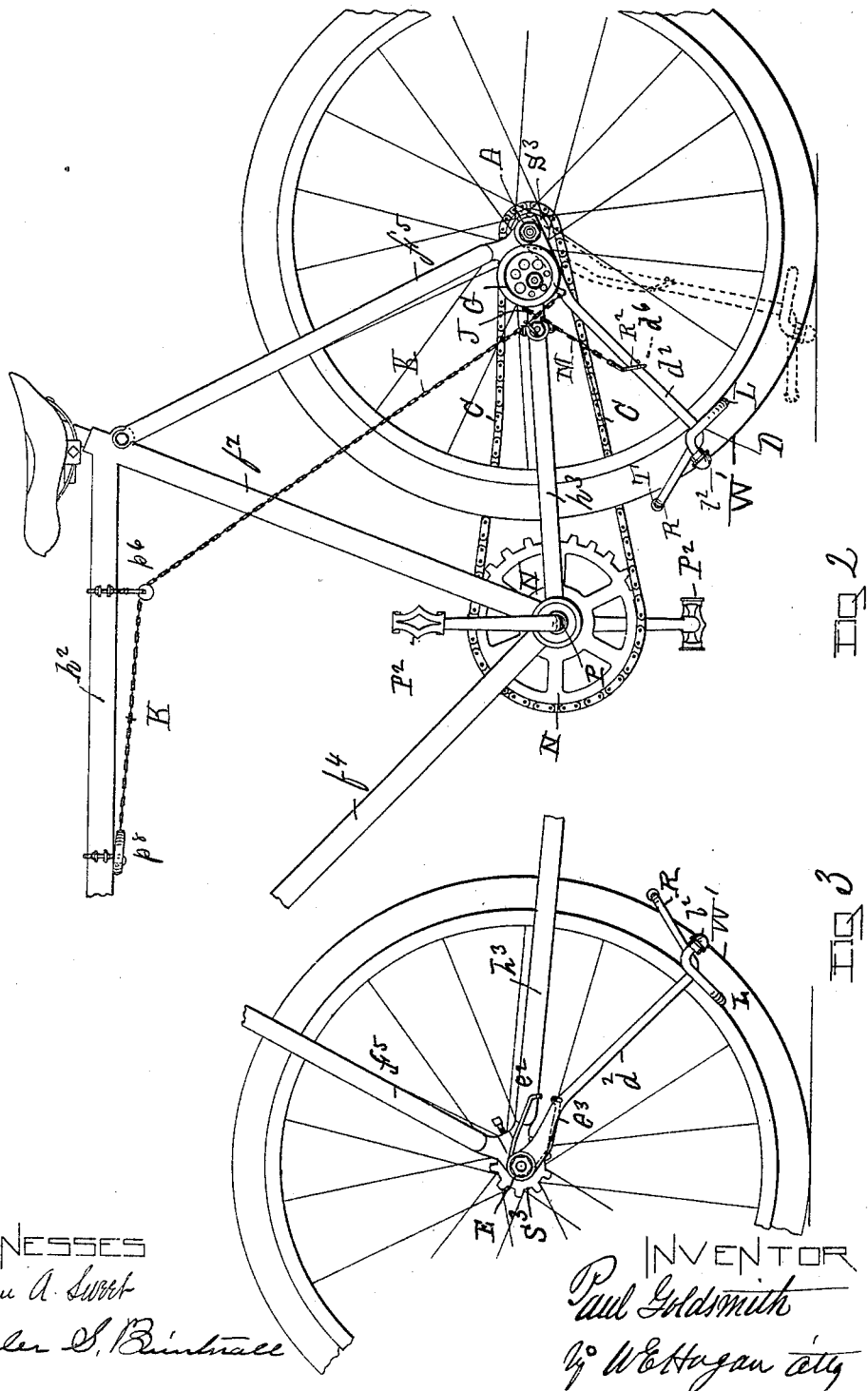

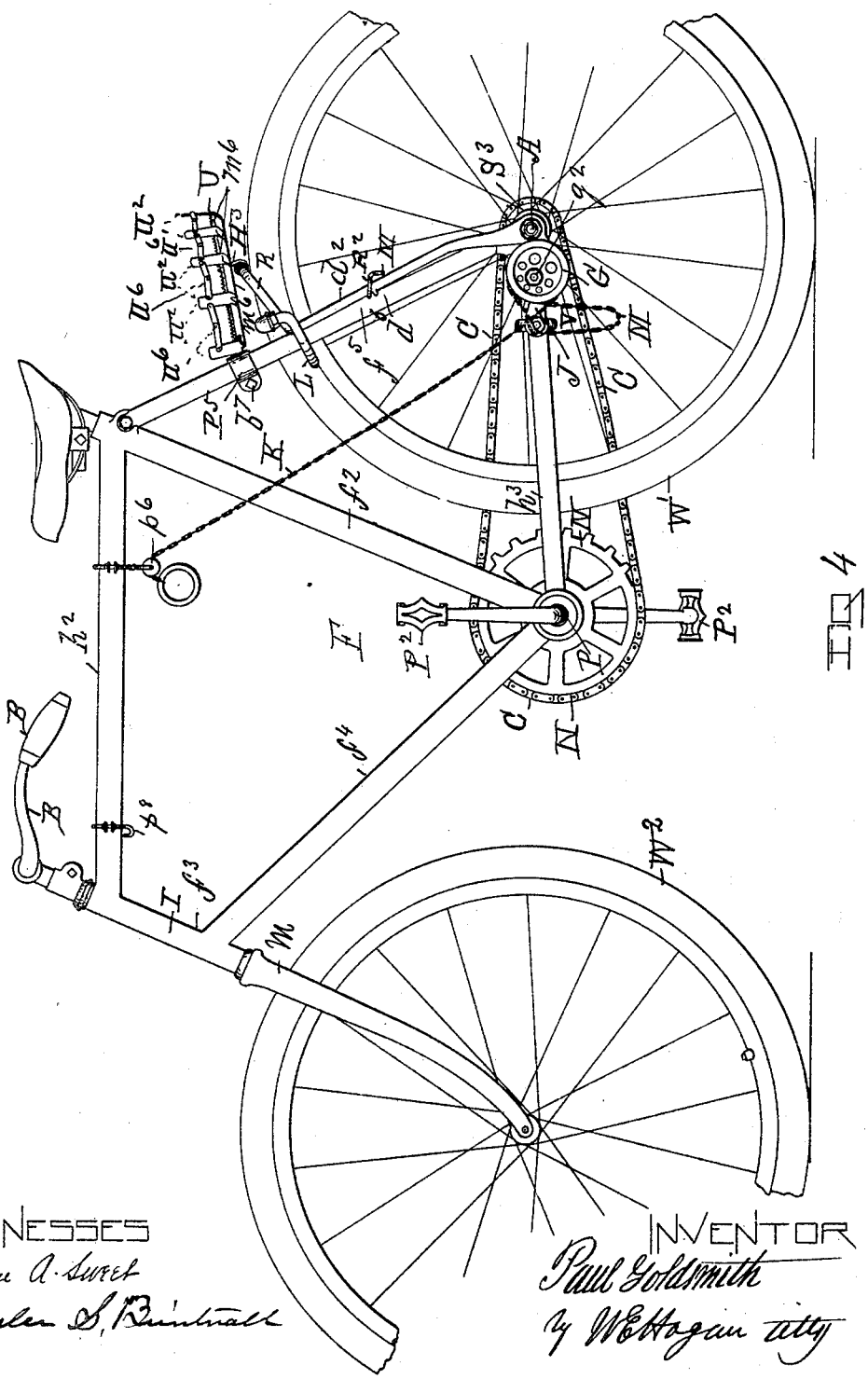

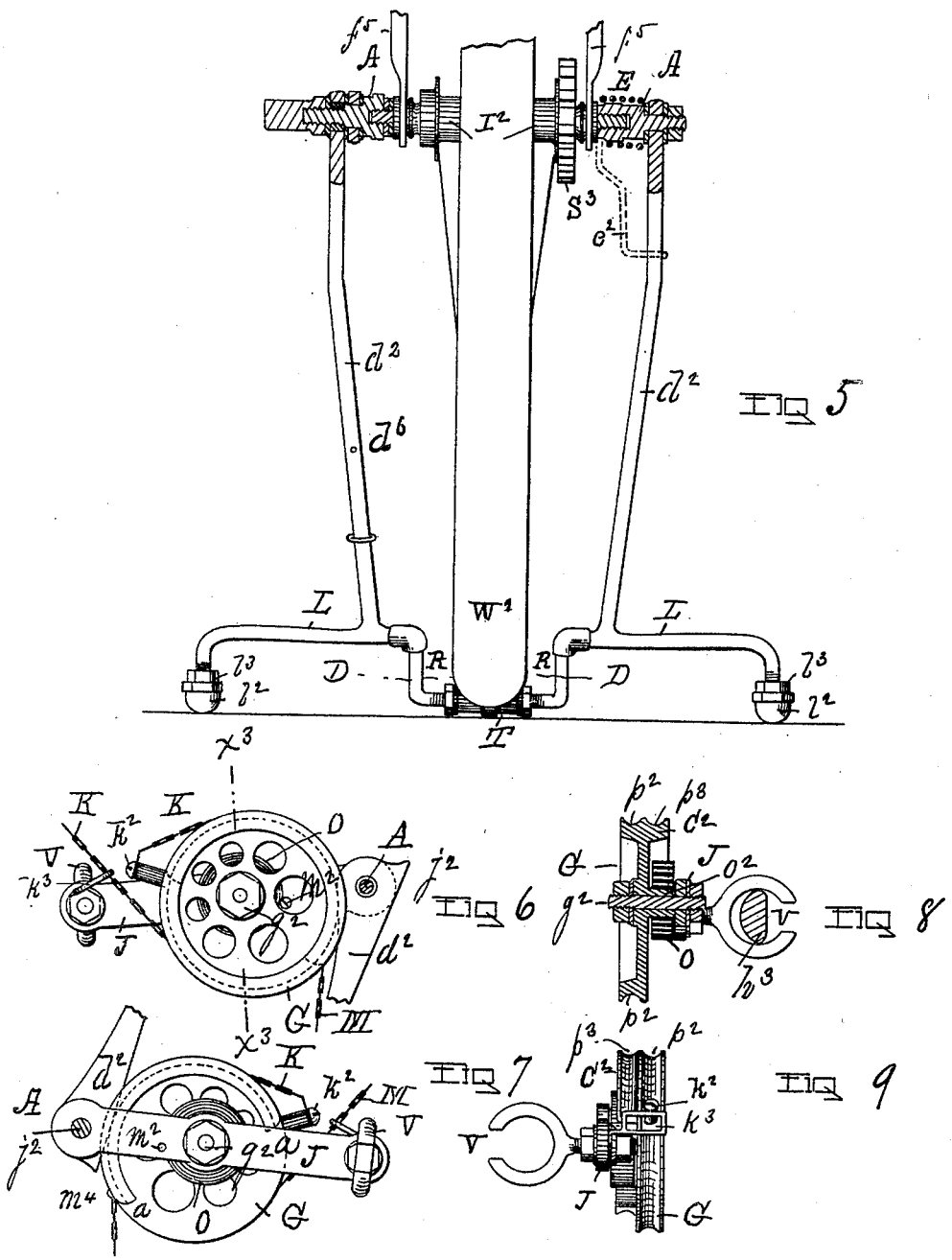

No. 649,663. Patented May 15, 1900.
P. GOLDSMITH.
BICYCLE SUPPORT.
(Application filed June 24, 1899.)
(No Model.) 5 Sheets—Sheet 5.
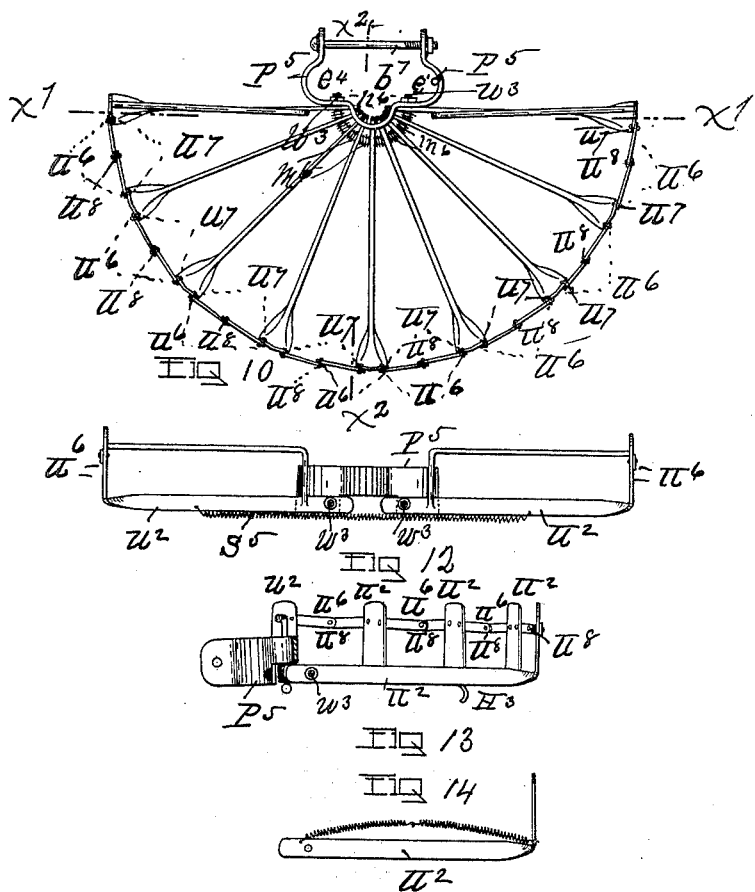
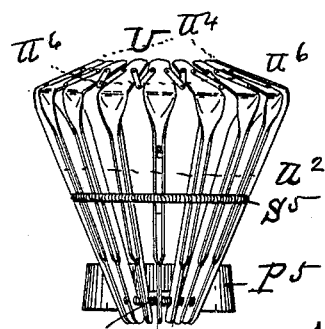
WITNESSES
William A. Sweet
Charles S. Burtnall
INVENTOR
Paul Goldsmith
by W E Hagan atty

UNITED STATES PATENT OFFICE.

PAUL GOLDSMITH, OF TROY, NEW YORK.

BICYCLE-SUPPORT.

SPECIFICATION forming part of Letters Patent No. 649,663, dated May 15, 1900.

Application filed June 24, 1899. Serial No. 721,677. (No model.)

*To all whom it may concern:*

Be it known that I, PAUL GOLDSMITH, of the city of Troy, county of Rensselaer, and State of New York, have invented a new and useful Combined Bicycle-Support, Home-Trainer, and Package-Carrier, of which the following is a specification.

My invention relates to bicycles, and mainly to improvements upon the mechanism shown and described in Letters Patent No. 581,550, granted to me April 27, 1897, said mechanism having for its object the construction and operation of a frame arranged to support a bicycle in a vertical position when the rider is mounting or dismounting, as well as to hold the bicycle in a vertical position with the driving-wheel raised from off the ground for practicing pedaling, my improvements herein relating to a new method of operating the bicycle-sustaining frame by which it will bear upon the ground at each side of the wheel in an improved manner to support and sustain the bicycle in a vertical position when the rider is mounting, dismounting, or desires to rest without dismounting and mechanism whereby the sustaining-frame can be easily removed after the rider has mounted and the bicycle is started.

My invention also relates to an improved form and construction of parcel or package carrier, which may be used in connection with the supporting-frame or without it.

Accompanying this specification to form a part of it are five plates of drawings, containing fourteen figures, illustrating my invention, the same designation of parts by letter reference being used in all of them.

Of the illustrations, Figure 1 is a side elevation of a bicycle containing my improvements with parts of the wheels broken out and with the sustaining-frame shown as raised from the ground. Fig. 2 shows in a side elevation the driving-wheel and part of the main frame with that side of the driving-wheel on which the mechanism operating the sustaining-frame is placed illustrated as facing the view. Fig. 3 is another side elevation of the driving-wheel with that side of the latter which is opposite to that shown at Fig. 2 illustrated as facing the view. Fig. 4 is a side elevation of the bicycle with the chain which connects with the sustaining-frame unhooked and the latter illustrated as moved rearwardly on its hinged connection with the axle of the driving-wheel and carried up over the latter, with the parcel-carrier resting thereon. Fig. 5 is an end view taken at the rear of the bicycle with the driving-wheel shown as broken off at its upper half and with the axle and connecting parts of the sustaining-frame illustrated in section. Fig. 6 is a side elevation of the cam-wheel arranged eccentrically upon a pintle-shaft projected from the outer face of a bar arranged to be parallel to, outside of, and connected to the bottom bar of the main frame. This figure shows the engagement of the rim of the cam on the cam-wheel with one of the side bars of the sustaining-frame and also part of the connecting-chains. Fig. 7 shows in elevation the reverse side of the parts illustrated at Fig. 6 with that one of the side bars of the sustaining-frame shown as operated upon by a cam-wheel to hold the frame steadily upon the ground at Fig. 6 shown in this illustration with the sustaining-frame raised to support a parcel-carrier and this same side bar held as raised by the cam-wheel. Fig. 8 is a section taken on the line $x^3$ $x^3$ of Fig. 6. Fig. 9 is a view of the cam-wheel and the pintle-shaft on which it turns, with the edge of the wheel facing the view. Fig. 10 is a plan view of the parcel-carrier shown as detached and as spread out for use. Fig. 11 is another view of the parcel-carrier illustrated as folded up. Fig. 12 is a section taken on the line $x'$ $x'$ of Fig. 10 with the parcel-carrier shown as spread out. Fig. 13 is a section taken on the line $x^2$ $x^2$ of Fig. 10. Fig. 14 is a side elevation of one of the parcel-carrier bars shown as detached from the others and the clamping-bar.

The several parts of the apparatus thus illustrated are designated by letter reference, and the function of the parts is described as follows:

The letter $W'$ designates the driving-wheel, $W^2$ the front wheel, and F the main frame, having the angularly-placed vertical frame parts $f^2$, $f^3$, $f^4$, and $f^5$ and the horizontal frame parts $h^2$ and $h^3$. The main-frame part $f^5$ below its top is longitudinally divided in two parts, between which at their lower ends the driving-wheel is journaled. The main-frame part $f^3$ is forked at its lower end, and it has journaled therein the front wheel $W^2$, and at its upper end this frame part $f^3$ is provided with a handle-bar B, and between the latter and its forked part $m$ this frame part is arranged to journal in the sleeve I, arranged upon the front ends of the frame parts $f^4$ and $h^2$. The letter P designates the pedal-shaft; $P^2$, the pedals; N, the sprocket-wheel, arranged on the pedal-shaft; $S^3$, a spur-wheel arranged upon the driving-wheel axle, and C a sprocket-chain belt arranged to run on said spur-wheel and the sprocket-wheel on the pedal-shaft, all which parts are of the usual and ordinary construction, with the exception that the axle A is made to project more than usual beyond the ends of the sleeve in which it journals.

The letters D designate the sustaining-frame, and $d^2$ $d^2$ the sides of the latter, each of which at its upper end is hinged to the opposite ends of the axle A, which projects beyond the sleeve $I^2$. These bars $d^2$ at their lower ends connect with the bar L to thus form the inclosed outer end of the frame D as extended outwardly from its hinged connection with the axle A. This bar L is arranged to be horizontally parallel to the axle A, and it is provided with a centrally-arranged and outwardly-projected recess R, located between where the side bars $d^2$ of the frame D connect with the bar L. This recess is made in the sustaining-frame for the entrance of the driving-wheel, so that the sustaining-frame where spread out at the wheel sides may hold the wheel advantageously. The bar L, where extending laterally beyond the connection with the sides $d^2$, is at its downturned ends provided with a foot $l^2$, adjustably threaded thereon and held as adjusted by the jam-nut $l^3$. This recess R as formed to project from the bar L is provided with a turnbuckle T, by which said recess may be widened out or made narrower when desired.

The letter J designates a horizontally-arranged bar which is located outside of and horizontally parallel with that one of the frame parts $h^3$ which is next adjacent thereto. One of the ends of this bar J, as designated at $j^2$, is journaled to the axle A where the latter projects beyond the sleeve $I^2$, in which the axle journals, and the other end of this bar J is provided with a C-form clutch V, adapted to clasp the next adjacent frame part $h^3$, as shown at Figs. 7 and 8. The letter G designates a wheel which is arranged to turn upon a pintle-shaft $g^2$, located in said bar J, and eccentrically in said wheel. This wheel G is provided with a circumferentially-grooved perimeter $p^2$, and the letter $C^2$ designates a cam arranged upon the inner side of the wheel G to move with the latter and having a grooved-out cam-surface $p^3$ formed to be parallel with that part of the perimeter of the wheel G which is between the stops $a$ $a$.

The letter O designates a coiled spring, the outer end of which is connected by a pin $m^2$ to the bar J and at its inner end to the barrel of the spring formed on the hub $O^2$ of the wheel G, by which construction and connection the wheel G is rotated on its eccentrically-located shaft against the force of said spring O.

The letter E designates a spring which is coiled upon the axle A upon that end of the latter which is opposite to that at which the bar J is connected and where the axle projects beyond the sleeve $I^2$, in which it journals. This spring E has tangent ends $e^2$ and $e^3$, the former of which bears against the next adjacent one of the frame parts $h^3$, and the other tangent end $e^3$ bears upon that one of the bars $d^2$ of the sustaining-frame D which is on the same side of the wheel as the spring E. As thus constructed the sustaining-frame D when moved frontwardly on its hinged connection with the axle A is so moved against the force of the spring E.

The letter K designates a chain which at one of its ends is attached to a pin $k^2$ and arranged to run in the perimetral groove $p^2$ of the wheel G, with said chain K passing out through the guide $k^3$ to extend frontwardly over the pulley $p^6$ on the frame part $h^2$ and to hook onto the under side of the frame part $h^2$ at $p^8$. The letter M designates another chain which connects with the cam $C^2$ at $m^4$ and runs in the grooved face thereof, with the lower end of this chain M provided with a ring $R^2$, encircling one of the bars $d^2$ below the outwardly-projecting pin $d^6$. When it is desired to raise the sustaining-frame into the position shown at Fig. 4, the chain M is unhooked from the link $R^2$ and the wheel $W'$ is raised, so that the sustaining-frame can be passed under it. That one of the bars $d^2$ which is hinged to the axle A next adjacent to the wheel G is rounded off on its front and rear edge back of the cam $C^2$ and in such a position relatively to the latter as to enter the cam-groove $p^3$ and be firmly held by said cam when the latter, acted upon by the spring O, forces the cam-face of the wheel G to contact with that one of the bars $d^2$ of the sustaining-frame with which it is arranged to engage when the sustaining-frame is on the ground or when raised, as shown at Figs. 4, 6, and 7.

The letter U designates the parcel-carrier, which when spread out for use has a fan form, as shown at Fig. 4, and which when not in use is shown as closed up at Fig. 1. This carrier is shown as detached in larger size and illustrated as opened out at Figs. 10, 12, and 13 and as detached and closed at Fig. 11. This parcel-carrier is composed of a clamping-plate $P^5$, having recesses $e^4$ and $e^5$ and a bolt $b^7$, by which it can be attached to the bifurcated main-frame part $f^5$, and of a series of radiately-placed bars $u^3$, arranged to connect in a fan-like form at their inner ends with the clamping-plate by means of a hinging-wire $w^3$, arranged in a semicircular position to pass through holes made in the inner end of each of these bars, with the ends of the wire outside of this hinging connection passing through the clamping-plate at opposite sides of the latter and thereat held by a nut $n^6$. The letters $m^8$ designate a coil-spring which is arranged to encircle the hinging-wire between each of the bars $u^2$, with the outer end of each of the latter turned up at $u^4$ and provided with intermediately-placed links $u^6$, arranged in pairs and each of the latter at one of the ends of each of them making a pivotal connection at $u^7$ to one of the bars $u^2$ and at their other ends $u^8$ pivotally connecting with each other. The letter $S^5$ designates a helical spring, each of the outer ends of which is connected to the outer one of the bars $u^2$ at each side of the carrier. As thus constructed when the parcel-carrier bars are spread apart and outwardly in a fan-like position they are so moved against the force of the spring $S^5$, and when the bars are moved inwardly to close the carrier the bars are held as closed by the action of said spring $S^5$.

The letters $H^3$ designate a hook arranged upon the under side of the carrier, as shown at Fig. 4, with said hook arranged to catch onto the turned-up sustaining-frame D.

The operation of the parts thus illustrated is as follows: With the sustaining-frame D in the position shown by the dotted lines in Fig. 2 the bicycle is steadily held in a vertical position for mounting, with the feet $l^2$ of the sustaining-frame resting firmly on the ground by the engagement which the cam $C^2$ makes with one of the bars $d^2$ of the sustaining-frame, as shown at Fig. 6. When the rider after being seated in the saddle brings his feet to bear upon the pedals and at the same time moves outwardly the chain K until it is hooked onto the under side of the frame part $h^2$ at $p^8$, this movement of the chain K operates the wheel G and the cam $C^2$ thereon, causing the latter to actuate the chain M, so that its ring will engage with the pin $d^6$, and thus cause the chain M to pull upwardly as well as outwardly the sustaining-frame D until it reaches the position shown by the full lines at Fig. 2 and where it is out of the way. Should the rider desire to stop to rest without dismounting or to dismount, by simply releasing the chain K from its engagement with the bar $h^2$ the spring E acts to pull rearwardly the sustaining-frame, while the spring O becomes active to reverse the position of the wheel G, thus causing its cam $C^2$ to engage with and hold secured in its position on the ground the sustaining-frame D. When it is desired to use the sustaining-frame as a support for the bicycle, with the driving-wheel raised from off the ground, the frame is moved to a point where it will be immediately beneath the vertical center of the wheel, as shown at Fig. 1.

In the mechanism shown and described in my older Letters Patent before named the frame sides of the sustaining-frame were pivotally attached to and arranged to depend from the driving-wheel axle to connect at right angles with the horizontal bar at each side of the driving-wheel, which bars were each of them parallel to the wheel sides where resting upon the ground. In my improved form of sustaining-frame herein shown feet are substituted for the horizontal bars, with the feet downwardly projected from the bar which is parallel to the axle, excepting where containing the centrally-located recess, this latter construction being better designed to meet uneven conditions of roadway.

Having thus described my invention, what I claim, and desire to secure by Letters Patent, is—

1. The combination with a bicycle driving-wheel axle, of a sustaining-frame having the inner end of each of its opposite sides hinged to the axle, at each side of the driving-wheel, on which hinged connection said sustaining-frame may swing down to rest upon the ground or be raised therefrom, with the sides of said frame at their outer ends each provided with a frame-part extension that is outwardly and oppositely projected therefrom to be parallel with said axle, and each at its outer end provided with a downturned foot, the said frame between its sides at its outer end having an outwardly-projected recess; and means substantially as described whereby said sustaining-frame may be steadily held in position when resting on the ground and when raised from off the latter, as and for the purposes set forth.

2. The combination with the axle of a bicycle driving-wheel of a sustaining-frame which at its inner end is hinged to the driving-wheel axle at each side of the wheel, and which frame at its lower end is provided with a centrally-located recess between its sides, and an outward and lateral extension for each of the frame sides provided with a foot; a spring encircling the driving-wheel axle at one of its ends where projecting beyond the wheel, with one of the tangent ends of said spring engaging with the bicycle-frame proper, and the other tangent end of the spring engaging with one of the side bars of the sustaining-frame against the force of which spring said sustaining-frame is moved frontwardly from off the ground, substantially as shown and described.

3. The combination with the axle of a bicycle driving-wheel of a sustaining-frame which at its inner end is hinged to the driving-wheel axle at each side of the driving-wheel, and which frame at its outer end is provided with an outwardly-projected recess centrally located between the frame sides, with each of the latter having an outward extension that is horizontally projected therefrom and at its outer end provided with a foot; a bar having one of its ends journaled to the driving-wheel axle, and at its other end attached to the main frame; a cam-wheel mounted eccentrically upon said bar, and provided with a grooved perimeter; and a spring arranged upon the hub of said cam-wheel by the action of which spring the grooved perimeter of the cam-wheel will be actuated to engage with one of the side bars of the sustaining-frame to hold it in position when raised or when resting upon the ground, substantially as shown and described.

4. The combination in a bicycle of a sustaining-frame that at its inner ends is hinged to the driving-wheel axle on which connection it is adapted to swing down to rest on the ground, or swing up therefrom; a bar which at one of its ends is connected to the main frame and at its other end journaled onto the driving-wheel axle; a wheel having a grooved perimeter, and upon one of its sides having a cam provided with a grooved perimeter; said wheel being mounted eccentrically on said bar; a detaining-spring encircling the hub of said cam-wheel and causing the latter to engage with and hold steadily said sustaining-frame upon the ground; a chain which at one of its ends is connected to the perimeter of said cam, and at its other end to the sustaining-frame; and a tripping-chain having one of its ends connected to the perimeter of said cam-wheel; whereby when tension is put upon said tripping-chain the sustaining-frame can be removed from the ground substantially as shown and described.

5. The combination with the axle of a bicycle driving-wheel of a sustaining-frame which at its inner ends is hinged to the bicycle-axle on which connection it may be operated to swing down onto the ground, or upwardly therefrom; a spring encircling the driving-wheel axle against the resiliency of which the sustaining-frame is raised from off the ground; a bar one end of which is journaled onto the driving-wheel axle, and its other end connected to the main frame; a wheel having a grooved perimeter, and upon one of its sides a cam having a grooved perimeter; said wheel being mounted eccentrically upon the said bar; a spring on the hub of said cam-wheel whereby it is caused to engage with the sustaining-frame to hold the latter steadily when resting on the ground, or when raised to sustain the weight of a package-carrier; a chain connecting with said cam at one of its ends and at its other end with the sustaining-frame; and a tripping-chain having one of its ends attached to the perimeter of said cam-wheel, which tripping-chain when drawn frontwardly will cause said cam-wheel to release its grip upon the sustaining-frame and move the latter from off the ground, substantially as, and for the purposes set forth.

6. The combination with the axle A, of the frame D, having one of its sides $d^2$, hinged at its upper end to the axle at each side of the driving-wheel and its outer end L, having formed therein the recess R, and where extending laterally outside of the latter at each end provided with a foot $l^2$; the spring E, coiled upon the axle A; the wheel G, mounted eccentrically upon the shaft $g^2$, and having the encircling groove $p^2$; the spring O, encircling the barrel of the wheel G; the cam $C^2$, having the cam-groove $p^3$, and arranged upon the side of the wheel G; the chain M, connecting with said cam at one of its ends and with the sustaining-frame at the other end; and the chain K, connecting with the wheel G, constructed and arranged to be operated substantially as and for the purposes set forth.

7. The combination with the parcel-carrier U, having the clamping-plate $P^5$, adapted to connect with the main-frame part $f^5$, and to be spread out laterally substantially as described; of the sustaining-frame D, at its inner end having a hinged connection with the driving-wheel axle on which it can be swung upwardly under said parcel-carrier to support the same when expanded; and mechanism whereby said sustaining-frame when raised will be steadily held to contact with said parcel-carrier substantially as shown and described.

8. The combination with the parcel-carrier U, provided with the hook $H^3$, and having the clamping-plate $P^5$, adapted to connect with the main-frame part $f^5$, and to be spread out laterally substantially as described; of the sustaining-frame D, having its inner end hinged to the driving-wheel axle, on which to be swung up under said parcel-carrier to connect with its hook; the bar J, which at one of its ends is hinged to the driving-wheel axle, and at its other end connected to the bicycle main frame; the cam-wheel G, mounted eccentrically upon said bar; the spring O encircling the hub of said cam-wheel, whereby the latter will be forced to engage with said sustaining-frame, and hold the latter in its hooked engagement with said parcel-carrier, substantially as shown and described.

Signed at the city of Troy, New York, this 15th day of June, 1899, and in the presence of the two witnesses whose names are hereto written.

PAUL GOLDSMITH.

Witnesses:
W. E. HAGAN,
CHARLES S. BRINTNALL.